United States Patent
Lee et al.

(10) Patent No.: US 8,284,720 B2
(45) Date of Patent: Oct. 9, 2012

(54) METHOD FOR SUPPORTING SHORT LATENCY DATA TRANSMISSION IN A MOBILE COMMUNICATION SYSTEM

(75) Inventors: Mi-Hyun Lee, Seoul (KR); Jae-Weon Cho, Suwon-si (KR); Hyun-Kyu Yu, Seoul (KR); Song-Nam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 888 days.

(21) Appl. No.: 12/118,074

(22) Filed: May 9, 2008

(65) Prior Publication Data

US 2008/0279143 A1 Nov. 13, 2008

(30) Foreign Application Priority Data

May 9, 2007 (KR) ........................ 10-2007-0045241

(51) Int. Cl.
*H04Q 11/00* (2006.01)
*H04W 4/00* (2009.01)

(52) U.S. Cl. ......................... 370/329; 370/338; 370/341

(58) Field of Classification Search ........................ None
See application file for complete search history.

(56) References Cited

U.S. PATENT DOCUMENTS

| 7,483,447 | B2 | 1/2009 | Chang et al. |
| 7,751,363 | B1 * | 7/2010 | Etemad et al. ................ 370/329 |
| 7,852,821 | B2 * | 12/2010 | Hyon et al. .................... 370/341 |
| 2003/0058817 | A1 | 3/2003 | Asai |
| 2005/0286408 | A1 | 12/2005 | Jin et al. |
| 2005/0286409 | A1 | 12/2005 | Yoon et al. |
| 2008/0075032 | A1 * | 3/2008 | Balachandran et al. ...... 370/317 |
| 2008/0153504 | A1 * | 6/2008 | Bourlas et al. ............. 455/452.1 |
| 2008/0227481 | A1 * | 9/2008 | Naguib et al. ............. 455/550.1 |
| 2008/0267271 | A1 * | 10/2008 | Vook et al. .................... 375/219 |

FOREIGN PATENT DOCUMENTS

| JP | 11-150577 A | 6/1999 |
| KR | 10-2006-0016184 A | 2/2006 |
| RU | 2 217 869 C2 | 11/2003 |
| WO | 00/69146 A1 | 11/2000 |
| WO | 01/05098 A1 | 1/2001 |
| WO | 2005/060357 A2 | 7/2005 |
| WO | 2005/088886 A1 | 9/2005 |
| WO | 2006/105004 A2 | 10/2006 |

OTHER PUBLICATIONS

Wimax Forum, Mobile WiMAX—Part 1: A Technical Overview and Performance Evaluation, Technical Paper, Aug. 2006.
Ching Yao Huang et al., Radio Resource Management of Heterogeneous Services in Mobile WiMAX Systems, Technical Paper, Feb. 2007, pp. 20-26, National Chiao Tung University, IEEE Wireless Communications, vol. 14, Issue 1.

* cited by examiner

*Primary Examiner* — Chi Pham
*Assistant Examiner* — Soon-Dong D Hyun
(74) *Attorney, Agent, or Firm* — Jefferson IP Law, LLP

(57) ABSTRACT

Disclosed is a method for transmitting a frame by a base station in a mobile communication system, in which the frame includes at least one uplink Advanced Air Interface (AAI) frame and at least one downlink AAI frame, the uplink AAI frame includes at least one uplink AAI subframe, the downlink AAI frame includes at least one downlink AAI subframe, the downlink AAI subframe includes resource assignment information, feedback information, and data, and the uplink AAI subframe includes feedback information and data.

24 Claims, 9 Drawing Sheets

METHOD FOR SUPPORTING SHORT LATENCY DATA TRANSMISSION IN A MOBILE COMMUNICATION SYSTEM

PRIORITY

This application claims the benefit under 35 U.S.C. §119(a) of a Korean patent application filed in the Korean Industrial Property Office on May 9, 2007, and assigned Serial No. 10-2007-0045241, the entire disclosure of which is hereby incorporated by reference.

BACKGROUND OF THE INVENTION

1. Field of the Invention

The present invention relates to a method for transmitting/receiving a frame in a mobile communication system.

2. Description of the Related Art

At present, mobile communication systems are being evolved so as to provide various services, such as broadcasting, multimedia images, multimedia messages, etc. In particular, a 4th generation mobile communication system is being developed in order to provide high-speed mobile users with data services at a data transfer rate of 100 Mbps or greater and to provide low-speed mobile users with data services at a data transfer rate of 1 Gbps or greater while departing from services centered on voice and packet data communications.

Most mobile communication systems take account of multiple access schemes so as to efficiently use finite frequency resources. The mobile communication systems also take account of duplexing schemes for identifying two-directional connections. That is, the mobile systems distinguish between an uplink connection and a downlink connection. One such scheme that considers both multiple access and duplexing is a Time Division Duplexing-Orthogonal Frequency Division Multiple Access (TDD-OFDMA) scheme.

FIGS. 1A and 1B illustrate a conventional TDD-OFDMA frame structure and a TDD-OFDMA frame structure with multiple zones, respectively.

Referring first to FIG. 1A, the TDD-OFDMA frame is divided into a downlink subframe and an uplink subframe, and a Transmission/reception Time Gap (TTG) is located between the two subframes. A preamble is located in a first symbol interval of the downlink subframe, and control information is located in a subsequent symbol interval of the downlink subframe. The control information includes a Frame Control Header (FCH), DownLink Media Access Protocol (DL-MAP), and UpLink Media Access Protocol (UL-MAP).

Referring next to FIG. 1B, each of the downlink and uplink subframes may include multiple zones according to subchannel configuration schemes.

In order to reliably transmit data at high speed in a mobile communication system, short latency is required. Here, the short latency refers to latency less than the predetermined threshold latency. For example, short latency may be required to apply Hybrid Automatic Repeat Request (HARQ) to a Voice over Internet Protocol (VoIP) service that is providing a real time service. However, short latency is not required for all packets. Here, latency can be represented by the following expression:

$$\text{Latency} = \text{Initial Transmission Time} + \text{Retransmission Probability} \times \text{Retransmission Delay} \quad (1)$$

That is, latency is determined by an initial transmission time, a retransmission probability and a retransmission delay. In view of the above expression, it can be noted that a retransmission probability or a retransmission delay must be reduced for a packet requiring short latency.

As mentioned above, there may be a packet requiring short latency. Accordingly, a frame supporting short latency must exist in order to transmit such a packet at high speed. Also, in order to transmit both a packet that does not require short latency and a packet that does require short latency in the same system, a frame corresponding to such transmission must exist.

SUMMARY OF THE INVENTION

An aspect of the present invention is to address at least the above-mentioned problems and/or disadvantages and to provide at least the advantages described below. Accordingly, an aspect of the present invention is to provide a method for supporting short latency data transmission in a mobile communication system.

Another aspect of the present invention is to provide a method for transmitting/receiving a frame in a mobile communication system.

In accordance with an aspect of the present invention, a method for transmitting a frame by a base station in a mobile communication system is provided. The method includes transmitting a frame, in which the frame includes at least one uplink frame and at least one downlink frame, the at least one uplink frame includes at least one uplink subframe supporting short latency, the at last one downlink frame includes at least one downlink subframe supporting short latency, the at least one downlink subframe includes resource assignment information and feedback information, and the at least one uplink subframe includes feedback information. Data is allocated to at least one of the at least one uplink subframe and the at least one downlink subframe.

In accordance with another aspect of the present invention, a method for receiving a frame by a base station in a mobile communication system is provided. The method includes receiving a frame, in which the frame includes at least one uplink frame and at least one downlink frame, the at least one uplink frame includes at least one uplink subframe supporting short latency, the at least one downlink frame includes at least one downlink subframe supporting short latency, the at least one downlink subframe includes resource assignment information and feedback information, and the at least one uplink subframe includes feedback information. Data is allocated to at least one of the at least one uplink subframe and the at least one downlink subframe.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1A:
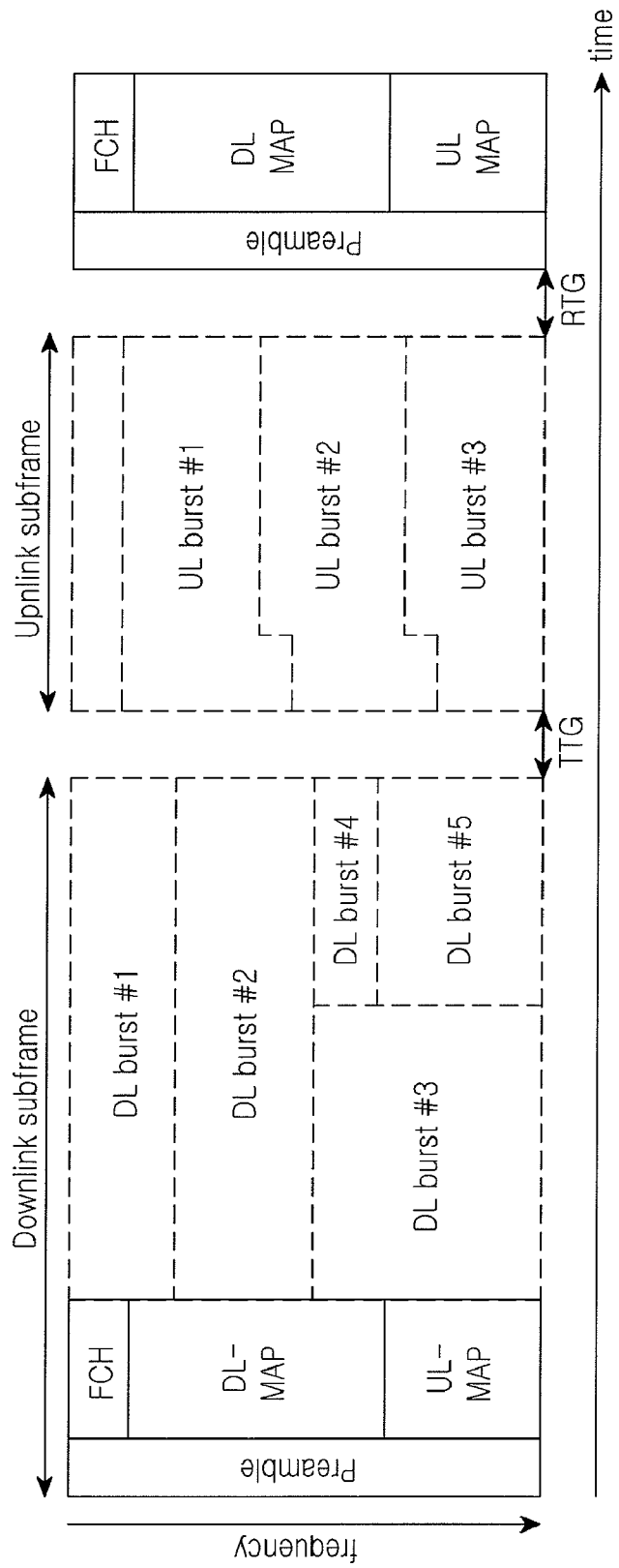
FIGS. 1A and 1B are views illustrating a conventional TDD-OFDMA frame structure and a TDD-OFDMA frame structure with multiple zones.
Figure 1B:
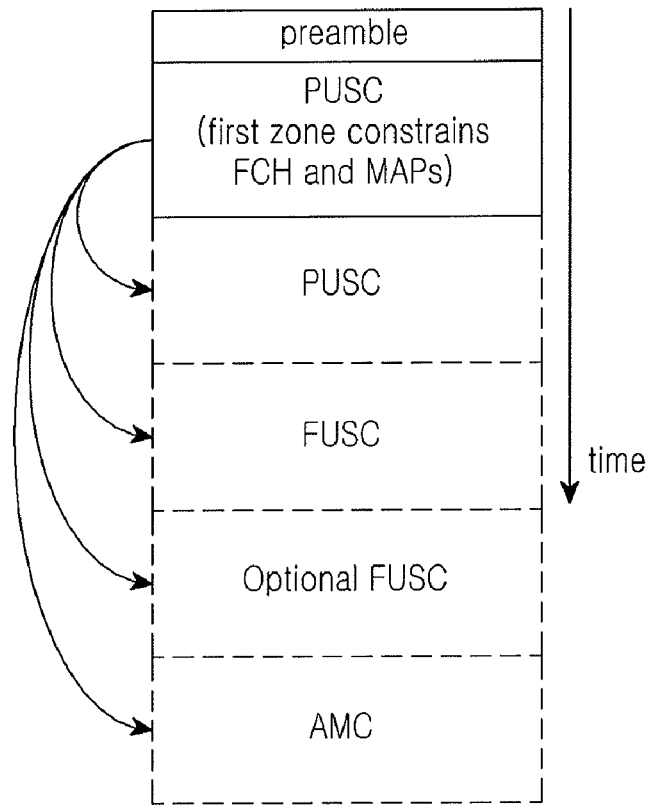
Figure 1B:
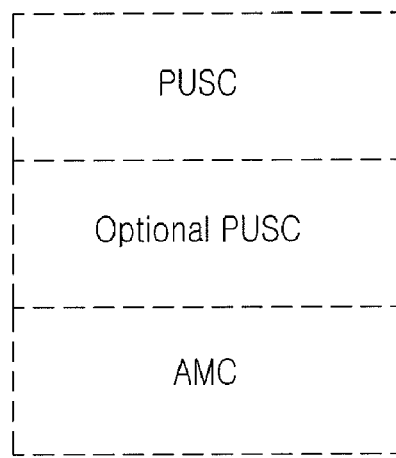

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose a method for supporting short latency data transmission in a mobile communication system. To this end, exemplary embodiments of the present invention support short latency data burst transmission by using multiple zones. Also, exemplary embodiments of the present invention propose new frame structures compatible with existing frame lengths and structures and a way to support short latency data transmission by using the proposed frame structures will be described in the following description.

For supporting short latency data transmission, a frame according to an exemplary embodiment of the present invention includes at least one zone as a transmission zone supporting short latency. Here, the frame may be a Time Division Duplexing-Orthogonal Frequency Division Multiple Access (TDD-OFDMA) frame. In an exemplary embodiment of the present invention, a zone as newly defined below is used as a short latency supporting zone. In the following description, a zone supporting short latency and a zone requiring strict latency (i.e., a zone requiring the support of strict latency requirement conditions) will be used as having the same meaning, and a zone not supporting short latency and a zone requiring flexible latency (i.e., a zone supporting flexible latency requirement conditions) will similarly be used as having the same meaning.

1. Short Latency Zone (SLZ): If data burst is transmitted through one short latency zone when a synchronous Hybrid Automatic Repeat Request (HARQ) scheme is applied, the data burst can obtain short latency by reducing a processing delay and a retransmission delay because it has a short transmission interval. The short latency zone exists in each of uplink and downlink subframes. The short latency zone is preferentially used for data requiring short latency but may also be used for data not requiring short latency if such use constitutes a more efficient use of resources. For the operation of the short latency zone, the following channels are defined. In addition, one subframe may include at least one short latency zone.

2. Downlink Short Latency Control Channel (D-SLCCH): A D-SLCCH refers to a downlink control channel used in a short latency zone. The D-SLCCH includes control information, such as data burst assignment information, feedback channel assignment information, and the like. This control channel may be located in each short latency zone.

3. Uplink Short Latency Control Channel (U-SLCCH): A U-SLCCH refers to an uplink control channel used in a short latency zone. This control channel may be located in each short latency zone.

4. Downlink Short Latency Data Channel (D-SLDCH): A D-SLDCH refers to a downlink data channel used in a short latency zone.

5. Uplink Short Latency Data Channel (U-SLDCH): A U-SLDCH refers to an uplink data channel used in a short latency zone.

6. Downlink Short Latency Feedback Channel (D-SLFCH): A D-SLFCH refers to a downlink control channel used in a short latency zone and corresponds to a feedback channel for uplink data.

7. Uplink Short Latency Feedback Channel (U-SLFCH): A U-SLFCH refers to an uplink control channel used in a short latency zone and corresponds to a feedback channel for downlink data. This channel is a logical channel.

Reference will now be made to the figures to assist in explaining a manner of achieving short latency data burst transmission according to exemplary embodiments of the present invention.

Figure 2:
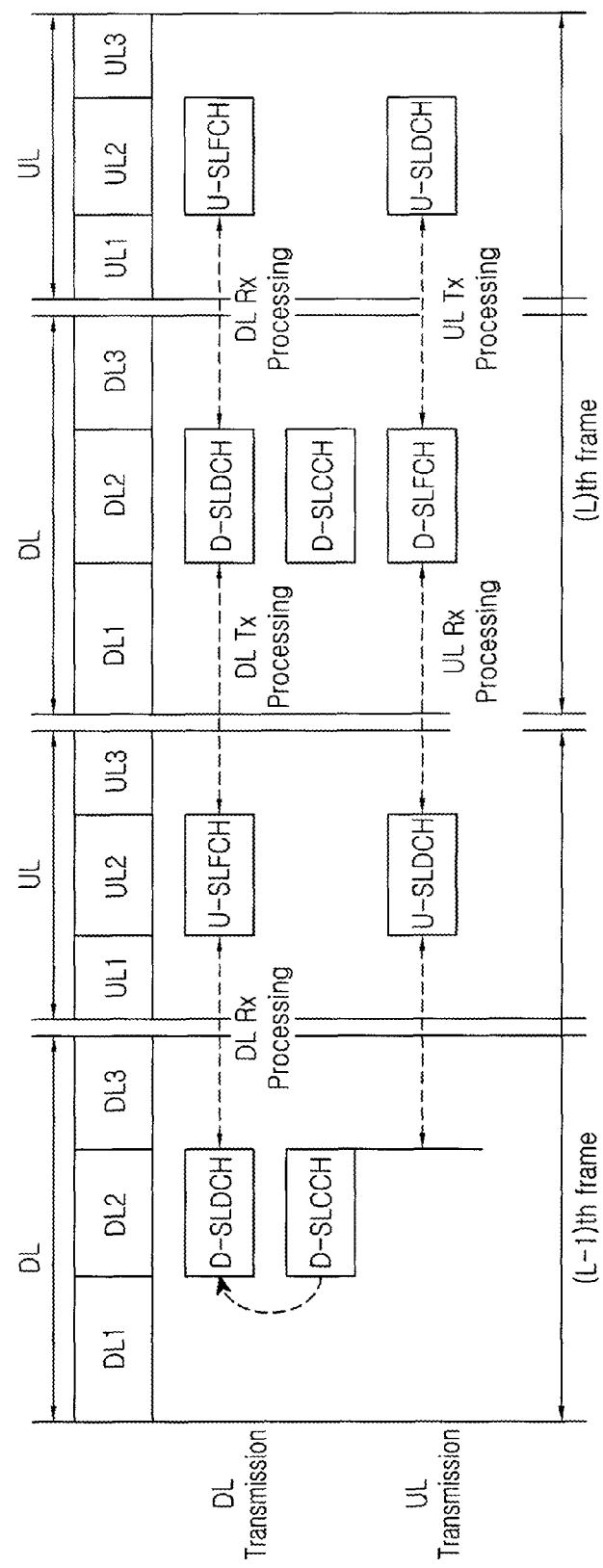
FIG. 2 is a view illustrating a TDD-OFDMA frame structure for supporting short latency data transmission in downlink according to an exemplary embodiment of the present invention.

First of all, one frame is divided into a plurality of time slots. FIG. 2 illustrates an example of such a frame in a TDD scheme. In the case of the TDD scheme, the plurality of time slots include downlink time slots and uplink time slots. In downlink, a short latency zone is located within a downlink frame and a dedicated channel for supporting the short latency zone is located in each of uplink and downlink frames. A more detailed description thereof will be given below with reference to FIG. 2.

FIG. 2 illustrates a TDD-OFDMA frame structure for supporting short latency data burst transmission in a downlink according to an exemplary embodiment of the present invention.

Referring to FIG. 2, in order to support short latency, each frame consists of multiple time zones DL1, DL2, DL3, UL1, UL2, UL3, and includes at least one short latency zone. In FIG. 2, there is illustrated a case where each frame consists of three zones and includes one short latency zone. Of course, it is to be understood that this is for example only and each may consist of a different number of zones, greater or less than three zones and that each frame may include more than one short latency zone. A downlink frame includes a D-SLCCH, a D-SLDCH, and a D-SLFCH. Also, an uplink frame includes a U-SLFCH and a U-SLDCH.

In downlink packet transmission, the D-SLCCH is used to indicate data burst assignment information and a transmission format. The D-SLDCH is used for data burst transmission that has strict latency requirement conditions. The U-SLFCH is used for feedback in response to a packet transmitted over the D-SLDCH. Here, a feedback channel may be defined or indicated by the D-SLCCH or the feedback channel may be predefined according to the location in which data is assigned.

In uplink packet transmission, control information is transmitted over the D-SLCCH within the downlink frame in order to support short latency. A mobile station transmits data burst requiring short latency over the U-SLDCH in an assigned zone. A base station receives the data from the mobile station and then transmits a feedback signal over the D-SLFCH. The short latency zone may include any time zone or a two-dimensional burst zone consisting of any time-frequency resource.

As mentioned above, in an exemplary embodiment of the present invention, an uplink frame or a downlink frame may be divided into various zones according to whether or not the support of short latency is required or desired. That is, the uplink or downlink frame may be divided into one or more zones for supporting short latency and one or more zones that do not support short latency. Here, each zone supporting short latency and each zone not supporting short latency may be divided into a Time Division Multiple Access (TDMA) scheme, a Frequency Division Multiple Access (FDMA) scheme, and an Orthogonal Frequency Division Multiple Access (OFDMA) scheme.

The zone supporting short latency may be used by a packet supporting HARQ, a packet passing through a channel with good conditions, a certain sized encoding packet, or the like. The zone that does not support short latency may be used by a packet not supporting HARQ, a packet passing through a channel with poor conditions, a large-sized encoding packet, or the like. In this way, when a zone that supports short latency and a zone that does not support short latency coexist in the same frame, the frame may be time-multiplexed or frequency-multiplexed.

The size of each zone in the multiplexed frame may vary according to the transmission capacity to be serviced. For example, the transmission capacity required by a first system may be compared with that required by a second system, and a larger-sized zone may be assigned to a system requiring larger transmission capacity. Of course, the first and second systems may be heterogeneous systems or a homogeneous system. When the first and second systems are the homogeneous system, a frame may be divided into multiple zones and the multiple zones may be multiplexed in consideration of packet types (service types) and channel conditions.

Figure 3:
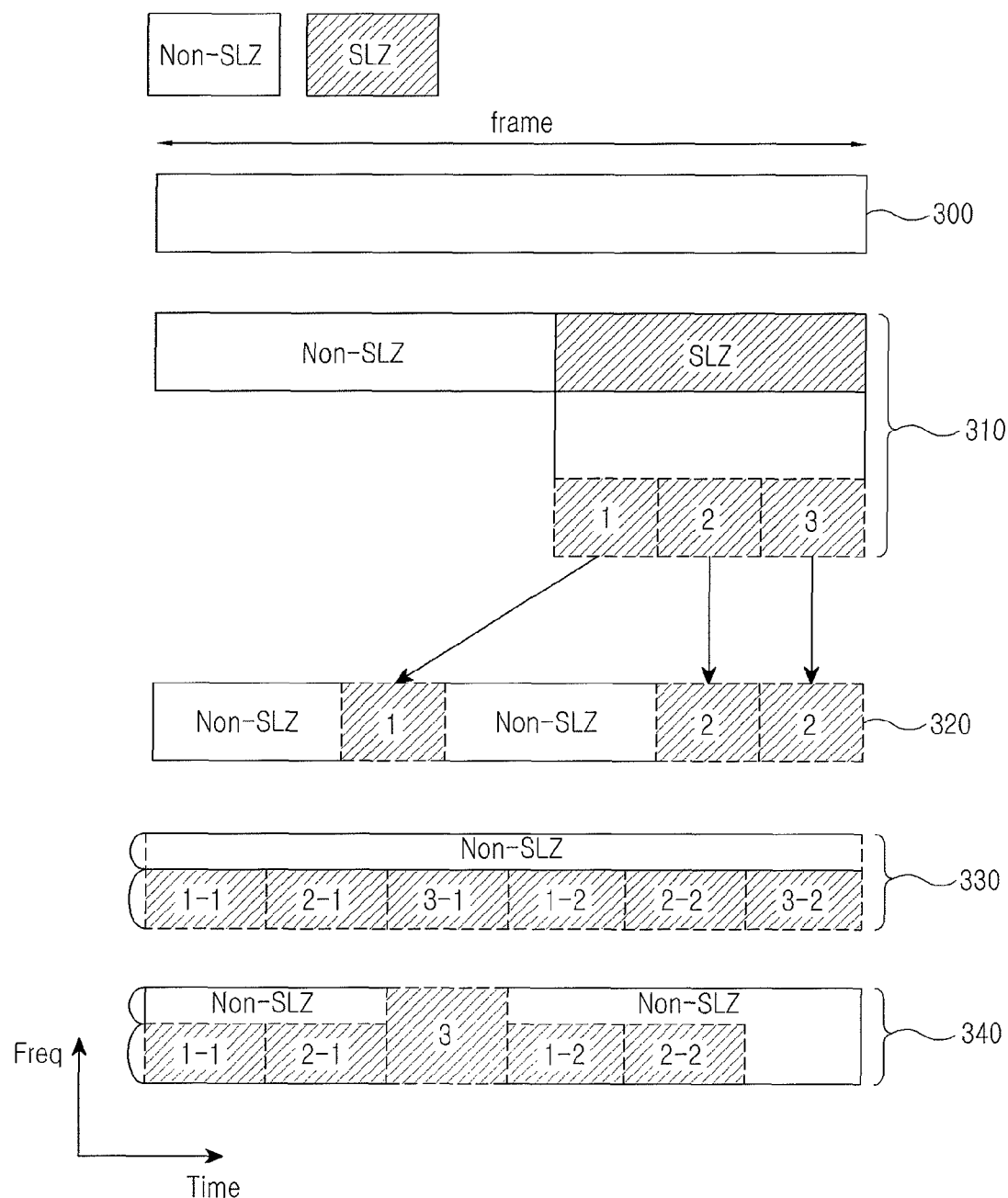
FIG. 3 is a view illustrating various examples of a frame divided into two zones according to the present invention.

FIG. 3 illustrates various examples of a frame divided into two zones according to the present invention.

Referring to FIG. 3, the frame may be an uplink frame or a downlink frame. One of the two zones is a zone supporting short latency and the other is a zone that does not support short latency. In the drawing, the zone supporting short latency is designated by "SLZ" and the zone that does not support short latency is designated by "non-SLZ".

Reference numeral "300" designates one frame that may consist of both an SLZ and a non-SLZ. Furthermore, the frame 300 may consist of only an SLZ or only a non-SLZ.

Reference numeral "310" designates an example when the one frame 300 consists of an SLZ and a non-SLZ. Also, in this example only, the SLZ as illustrated in 310 includes three short latency zones. As mentioned above, the size and number of zones supporting strict latency requirement conditions within one frame may be diversely determined according to cell situations.

Reference numerals "320" to "340" designate examples that include multiple zones for supporting short latency, which are diversely mapped to physical channels according to cell or other situations or requirements. Reference numeral "320" designates an example where respective SLZs and non-SLZs are time-multiplexed. It illustrates that the short latency zones may be located in any location within the frame.

Reference numeral "330" designates an example where respective SLZs are time-multiplexed and an SLZ and a non-SLZ are frequency-multiplexed. Furthermore, although not illustrated, the respective SLZs may have different sizes.

Reference numeral "340" designates an example where a short latency zone constituting an SLZ and non-SLZs are time-multiplexed and some short latency zones and a non-SLZ are frequency-multiplexed.

Figure 4:
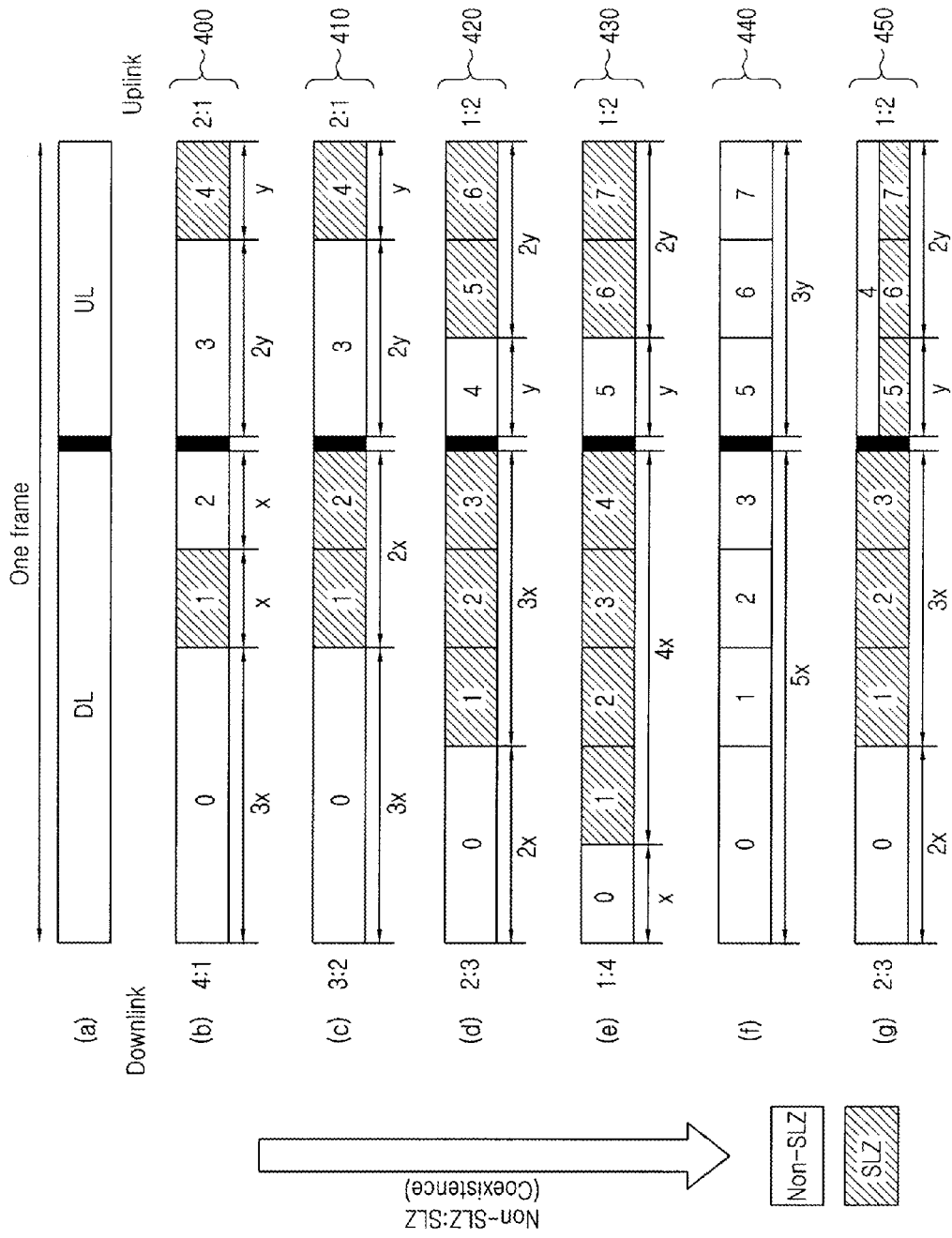
FIG. 4 is a view illustrating frame structures that can be configured in different ratios depending on cell states in accordance with an exemplary embodiment of the present invention.

FIG. 4 illustrates frame structures in which an SLZ and a non-SLZ are configured in different ratios depending on cell states according to exemplary embodiments of the present invention.

Referring to FIG. 4, in the illustrated examples, a frame is divided into a downlink frame and an uplink frame, and each of the downlink and uplink frames includes an SLZ and a non-SLZ. As an example, the illustrated size ratio between the downlink frame and the uplink frame is 5:3.

Reference numeral "400" designates a downlink frame including a non-SLZ and an SLZ in the size ratio of 4:1 and an uplink frame including a non-SLZ and an SLZ in the size ratio of 2:1.

Reference numeral "410" designates a downlink frame including a non-SLZ and an SLZ in the size ratio of 3:2 and an uplink frame including a non-SLZ and an SLZ in the size ratio of 2:1.

Reference numeral "420" designates a downlink frame including a non-SLZ and an SLZ in the size ratio of 2:3 and an uplink frame including a non-SLZ and an SLZ in the size ratio of 1:2.

Reference numeral "430" designates a downlink frame including a non-SLZ and an SLZ in the size ratio of 1:4 and an uplink frame including a non-SLZ and an SLZ in the size ratio of 1:2.

Reference numeral "440" designates downlink and uplink frames, both of which include only a non-SLZ.

Reference numeral "450" designates a downlink frame in which a non-SLZ and an SLZ are time-multiplexed, and an uplink frame in which a non-SLZ and an SLZ are frequency-multiplexed. Various size ratios may be set between the two zones.

Information about the size ratio between downlink and uplink frames may be provided to a mobile station over a broadcast channel. In addition, information as to whether or not to provide short latency, the number of short latency zones, and the location and size information of each short latency zone may also be provided to the mobile station over the broadcast channel. For example, in the downlink frame of the frame structure designated by reference numeral "400", the short latency zone begins at a point where the non-SLZ (3×) ends. That is, through the broadcast channel, a base station informs the mobile station that the short latency zone over one interval (x) begins at a point where the non-SLZ ends.

The broadcast channel may be included in each frame or may be included in a frame in a certain cycle. That is, the mobile station acquires synchronization with the base station by using a preamble, and then recognizes a frame configuration by using information provided over the broadcast channel. Although FIG. 4 illustrates that a frame is time-multiplexed according to cell situations, this is for example only. It should be obvious that the frame may be multiplexed in various forms, as illustrated in FIG. 3. Also, examples of the cell situations which may affect the size and number of zones supporting strict latency include cell coverage, link budget, throughput, migration to a system, etc.

Figure 5:
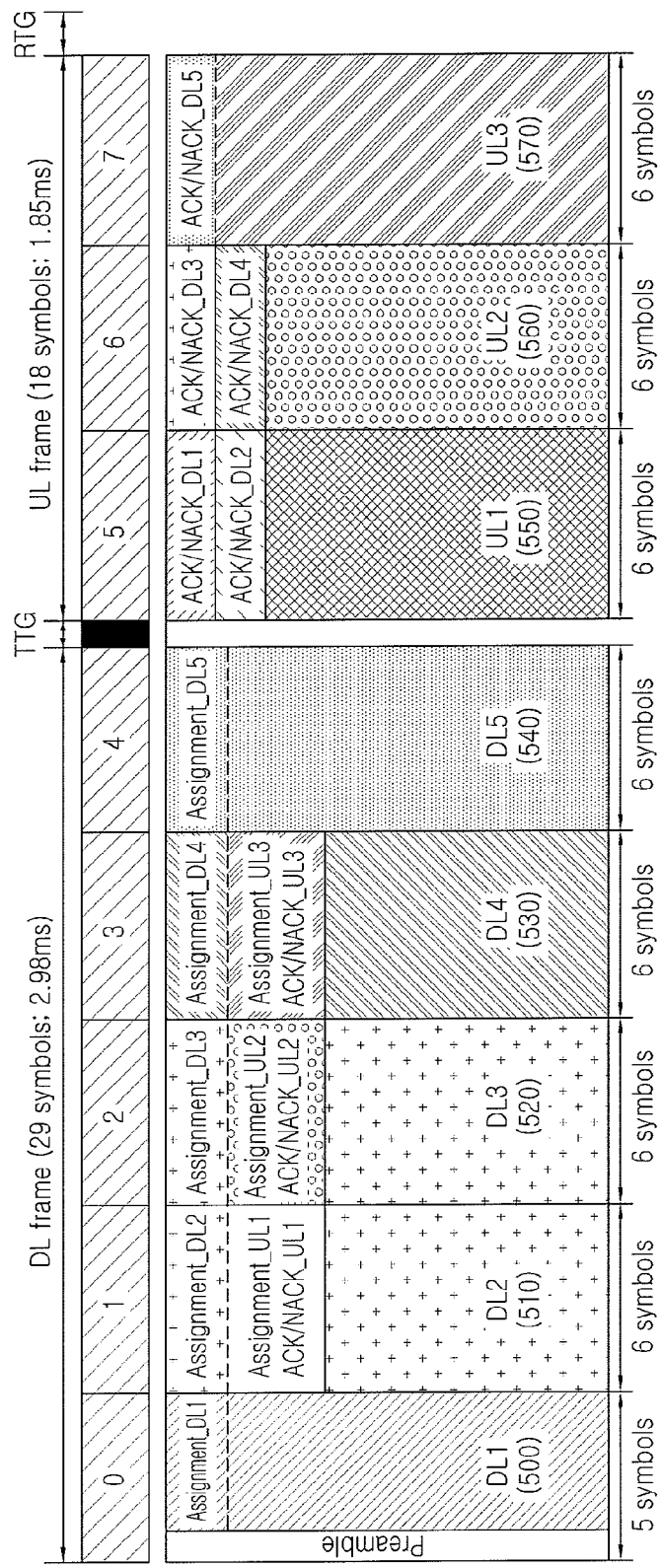
FIG. 5 is a view illustrating a frame structure including short latency zones in accordance with an exemplary embodiment of the present invention.

FIG. 5 illustrates a frame structure including multiple short latency zones according to an exemplary embodiment of the present invention.

Referring to FIG. 5, a frame is divided into a downlink frame and an uplink frame and the symbol ratio between the downlink and uplink frames is 29:18. The downlink frame includes five short latency zones, and the uplink frame includes three short latency zones. In the example of FIG. 5, the five short latency zones in the downlink frame are DL1 500, DL2 510, DL3 520, DL4, 530, and DL5 540 in sequence, and the three short latency zones in the uplink frame are UL1 550, UL2 560, and UL3 570 in sequence.

A packet supporting short latency in downlink transmission is assigned, (re)transmitted, and fed back as follows:

A receiving end transmits feedback for a packet, transmitted by a transmitting end in DL1 500, to the transmitting end over channel ACKnowledge/Negative ACKnowledge (ACK/NACK DL1) in UL1 550. The transmitting end transmits or retransmits the packet in DL1 of the next frame according to the feedback from the receiving end.

The receiving end transmits feedback for a packet, transmitted by the transmitting end in DL2 510, to the transmitting end over channel ACK/NACK DL2 in UL1 550. The transmitting end transmits or retransmits the packet in DL2 of the next frame according to the feedback from the receiving end.

The receiving end transmits feedback for a packet, transmitted by the transmitting end in DL3 520, to the transmitting end over channel ACK/NACK DL3 in UL2 560. The transmitting end transmits or retransmits the packet in DL3 of the next frame according to the feedback from the receiving end.

The receiving end transmits feedback for a packet, transmitted by the transmitting end in DL4 530, to the transmitting end over channel ACK/NACK DL4 in UL2 560. The transmitting end transmits or retransmits the packet in DL4 of the next frame according to the feedback from the receiving end.

The receiving end transmits feedback for a packet, transmitted by the transmitting end in DL5 540, to the transmitting end over channel ACK/NACK DL5 in UL3 570. The transmitting end transmits or retransmits the packet in DL5 of the next frame according to the feedback from the receiving end.

A packet supporting short latency in an uplink transmission is assigned, (re)transmitted, and fed back as follows:

For a packet transmitted in UL1 550, assignment information for the transmitted packet is indicated through channel Assignment UL1 in DL2 510, and feedback information for the transmitted packet is provided through channel ACK/NACK_UL1 in DL2 510 of the next frame.

For a packet transmitted in UL2 560, assignment information for the transmitted packet is indicated through channel Assignment UL2 in DL3 520, and feedback information for the transmitted packet is provided through channel ACK/NACK_UL2 in DL3 520 of the next frame.

For a packet transmitted in UL3 570, assignment information for the transmitted packet is indicated through channel Assignment_UL3 in DL4 530, and feedback information for the transmitted packet is provided through channel ACK/NACK_UL3 in DL4 530 of the next frame. In the foregoing, various transmission/reception processing times may be considered according to each packet transmission and packet transmission in each short latency zone is performed in a certain retransmission cycle.

In consideration of a processing delay time, there is a delay equal to or greater than the length of the zone supporting strict latency requirement conditions between the zones corresponding to each other between the downlink and uplink frames.

Figure 6:
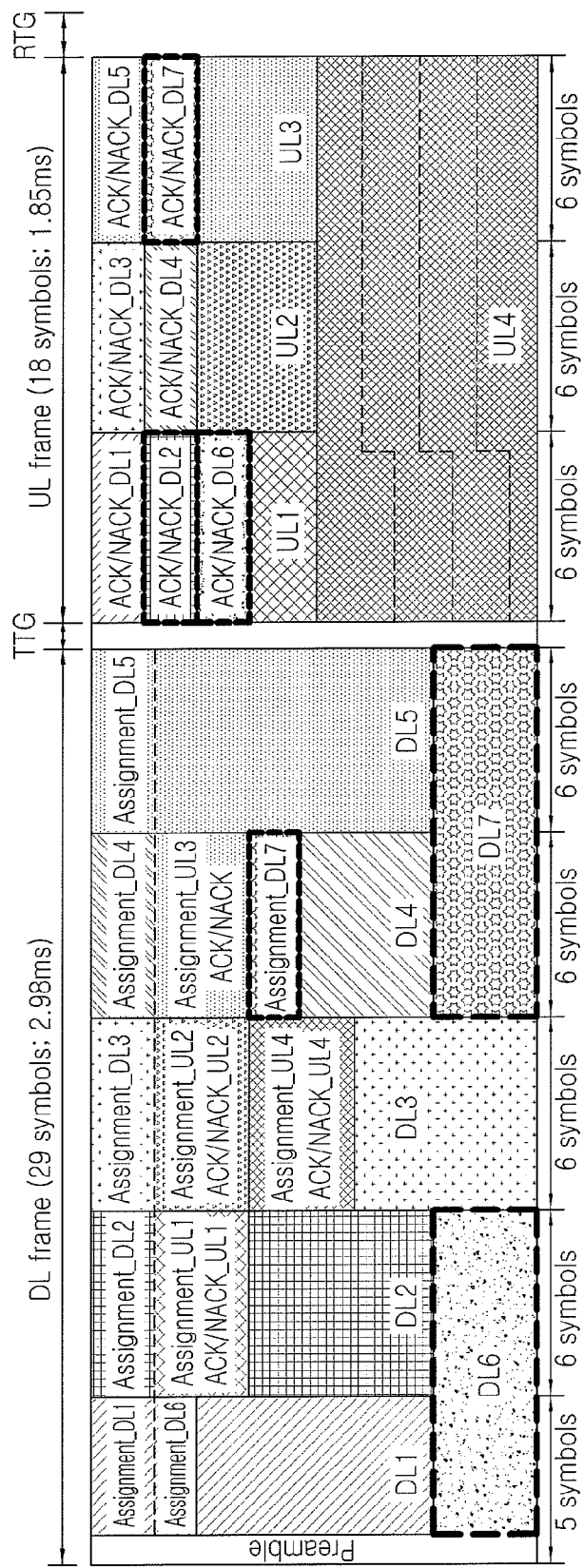
FIG. 6 is a view illustrating a frame structure in accordance with an exemplary embodiment of the present invention.

FIG. 6 illustrates a frame structure according to an exemplary embodiment of the present invention.

Referring to FIG. 6, a frame is divided into a downlink frame and an uplink frame, the downlink frame includes five short latency zones, and the uplink frame includes three short latency zones.

In FIG. 6, a zone requiring flexible latency and a zone requiring strict latency are provided in an OFDMA scheme over time and frequency domains. Here, the zone requiring flexible latency refers to a zone in which data is transmitted or received through at least two SLZs. In the frame of FIG. 6, DL6 and DL7 correspond to such a zone. The zone requiring strict latency refers to a zone in which data is transmitted or received through one SLZ. If data requiring flexible latency is transmitted within certain intervals, that is, through a certain number of SLZs, a feedback according to short latency requirement conditions can be received. Therefore, data burst transmission or data burst reception in the zone requiring flexible latency may also satisfy short latency.

For example, resource assignment necessary for data burst transmission through DL6 is indicated through Assignment_DL6 within zone DL 1 where DL6 begins. A feedback for this may be provided through ACK/NACK_DL6 in UL1 within the uplink subframe. Also, data burst (re)transmission for this may be performed in DL6 of the next frame. Although the data burst transmission in DL6 is provided in the zone requiring flexible latency, it can satisfy short latency requirements. Feedback for a packet transmitted through DL7 is performed through an uplink frame interval after at least one frame passes by. For example, the feedback may be performed in UL3 after at least one frame passes by corresponding to the location of UL3 in FIG. 6. Subsequently, data transmission or retransmission as a result of the feedback is performed through DL7 with a certain delay.

As mentioned above, exemplary embodiments of the present invention can support data transmissions that have different retransmission delays within one and the same frame structure.

Feedback for a packet transmitted through UL4 is performed through ACK/NACK_UL4 located in DL3 of the next frame. In this case, since even a packet with length equal to or greater than the size of one short latency zone is fed back in the next downlink frame, and the feedback enables packet retransmission (transmission) in the next uplink frame, short latency can be supported via a retransmission delay as long as a frame length.

When considering a frame in which the symbol ratio between downlink and uplink frames is 29:18, the downlink frame may include a first short latency zone consisting of 5 symbols, and four short latency zones, each consisting of 6 symbols. Also, the uplink frame may include three short latency zones, each consisting of 6 symbols.

Figure 7:
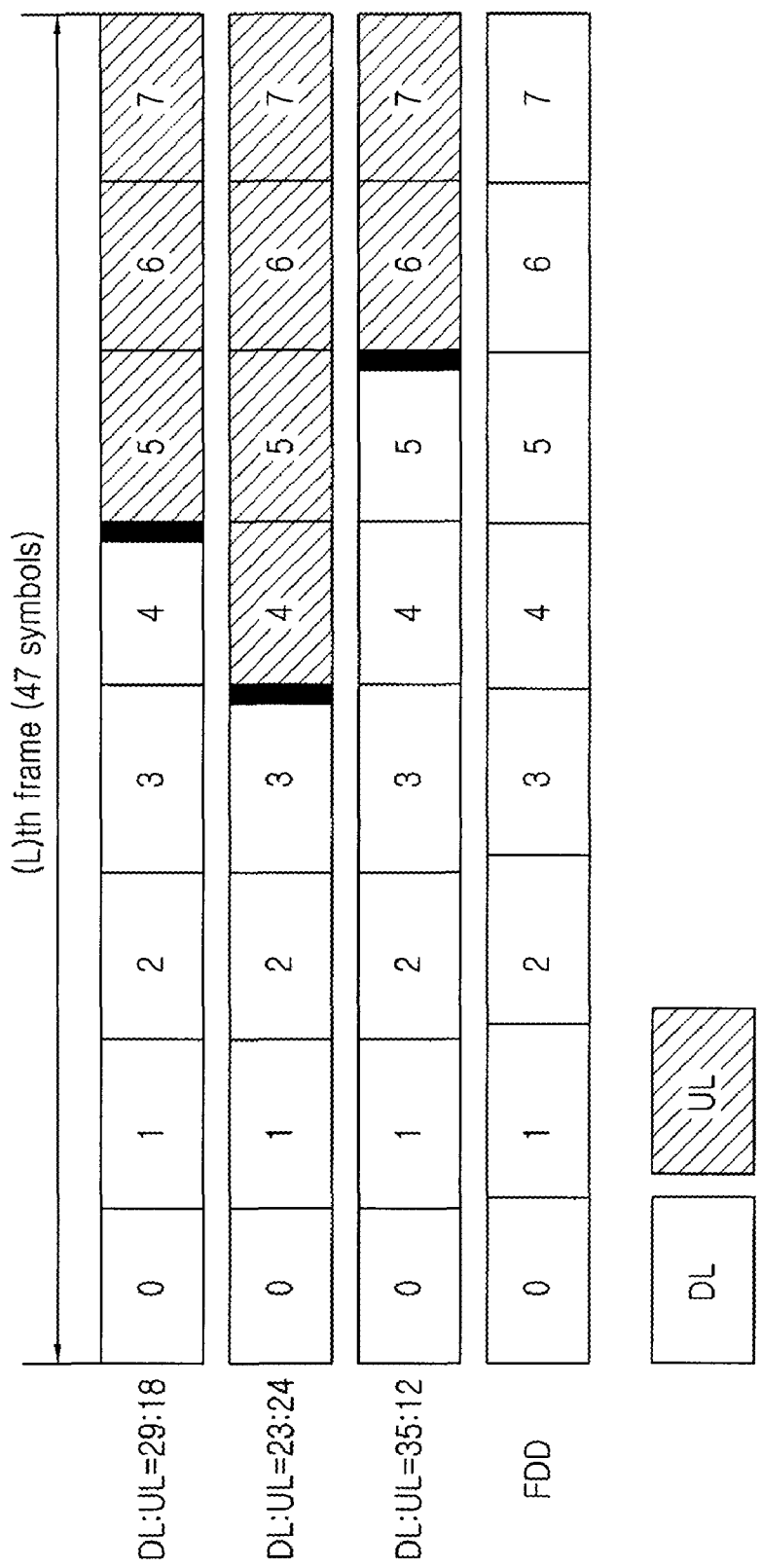
FIG. 7 is a view illustrating frame structures according to different symbol ratios between downlink and uplink frames in accordance with an exemplary embodiment of the present invention.

FIG. 7 illustrates frame structures according to different symbol ratios between downlink and uplink frames according to exemplary embodiments of the present invention.

Referring to FIG. 7, various symbol ratios between downlink and uplink frames of a frame, such as 29:18, 23:24, 35:12, and so forth, may be achieved according to system implementations. Referring to FIG. 7, it can be noted that various TDD ratios can be supported based on one short latency zone.

When the symbol ratio between downlink and uplink frames is 29:18, in the downlink frame, zone #0 may consist of 5 symbols, and each of zone #1, zone #2, zone #3, and zone

4 may consist of 6 symbols. Also, in the uplink frame, each of zone #5, zone #6, and zone #7 may consist of 6 symbols.

When the symbol ratio between downlink and uplink frames is 23:24, in the downlink frame, zone #0 may consist of 5 symbols, and each of zone #1, zone #2, and zone #3 may consist of 6 symbols. Also, in the uplink frame, each of zone #4, zone #5, zone #6, and zone #7 may consist of 6 symbols.

When the symbol ratio between downlink and uplink frames is 35:12, in the downlink frame, zone #0 may consist of 5 symbols, and each of zone #1, zone #2, zone #3, zone #4, and zone #5 may consist of 6 symbols. Also, in the uplink frame, each of zone #6 and zone #7 may consist of 6 symbols.

Figure 8:
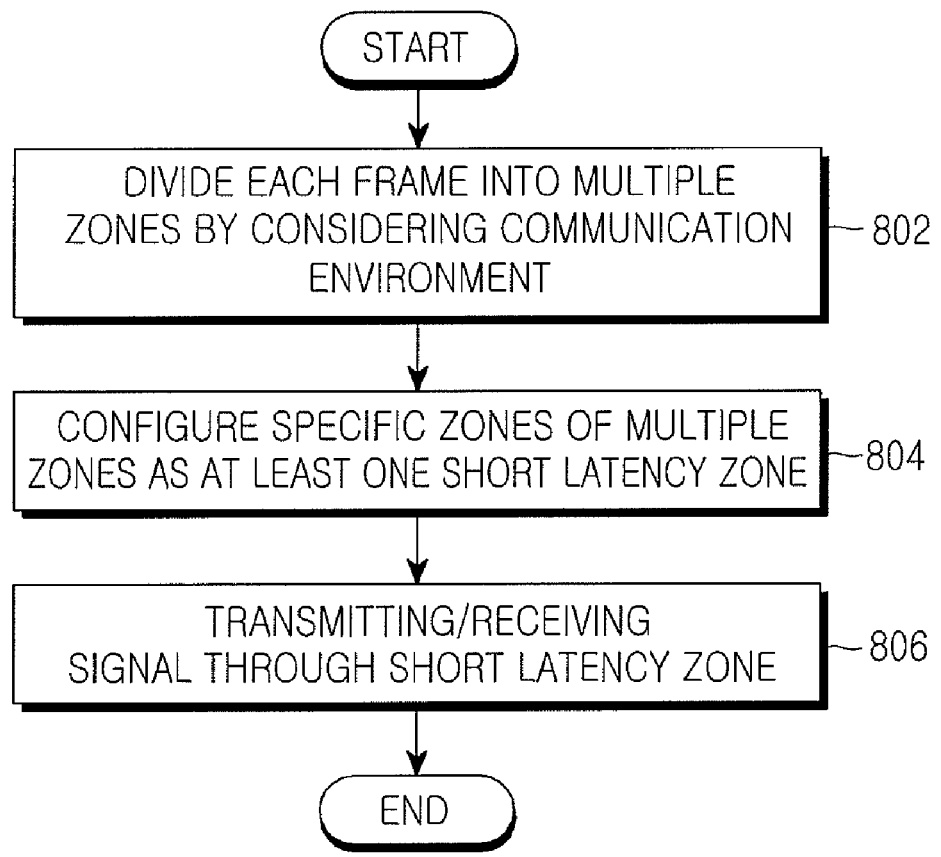
FIG. 8 is a flowchart illustrating a procedure for transmitting/receiving a signal through a short latency zone by a base station in accordance with an exemplary embodiment of the present invention.

FIG. 8 illustrates a procedure for transmitting/receiving a signal through a short latency zone by a base station according to an exemplary embodiment of the present invention.

Referring to FIG. 8, in step 802, the base station divides each of downlink and uplink frames into multiple zones by taking account of a communication environment. In step 804, the base station configures specific ones of the divided multiple zones as at least one short latency zone. In step 806, the base station transmits/receives a signal through the short latency zone.

As describe above, exemplary embodiments of the present invention provide new channels and frame structures capable of processing data and services requiring short latency.

While the invention has been shown and described with reference to certain exemplary embodiments thereof, it will be understood by those skilled in the art that various changes in form and details may be made therein without departing from the spirit and scope of the invention as defined by the appended claims and equivalents thereof.

What is claimed is:

1. A method for transmitting and receiving a signal by a base station in a mobile communication system, the method comprising:
   transmitting and receiving the signal using a frame,
   wherein the frame includes at least one uplink frame and at least one downlink frame, the at least one uplink frame includes at least one uplink subframe supporting Hybrid Automatic Repeat Request (H-ARQ) Feedback within one frame interval, the at last one downlink frame includes at least one downlink subframe supporting H-ARQ Feedback within one frame interval, the at least one downlink subframe includes resource assignment information and feedback information, and the at least one uplink subframe includes feedback information, and
   wherein data is allocated to at least one of the at least one uplink subframe and the at least one downlink subframe.

2. The method as claimed in claim 1, wherein the at least one uplink frame and the at least one downlink frame include the at least one uplink subframe and the at least one downlink sub-frame respectively, and wherein a ratio of the number of the at least one uplink subframe to the number of the at least one downlink subframe corresponds to a first ratio.

3. The method as claimed in claim 2, wherein the first ratio is A:B, which is a ratio of the number of uplink subframes with respect to the number of downlink subframes, and the ratio of A:B is any one of 5:3, 4:4, and 6:2.

4. The method as claimed in claim 1, wherein data requiring short latency is allocated to at least one of the at least one uplink subframe and the at least one downlink subframe.

5. The method as claimed in claim 1, wherein data requiring short latency is allocated to at least one of one uplink subframe and one downlink subframe, and data requiring long latency is allocated to at least one of at least two uplink subframe and at least two downlink subframe.

6. The method as claimed in claim 5, wherein, a retransmission delay of the data requiring long latency is longer than a retransmission delay of the data requiring short latency.

7. A method for transmitting and receiving a signal by a mobile station in a mobile communication system, the method comprising:
   transmitting and receiving the signal using a frame,
   wherein the frame includes at least one uplink frame and at least one downlink frame, the at least one uplink frame includes at least one uplink subframe supporting Hybrid Automatic Repeat Request (H-ARQ) Feedback within one frame interval, the at least one downlink frame includes at least one downlink subframe supporting H-ARQ Feedback within one frame interval, the at least one downlink subframe includes resource assignment information and feedback information, and the at least one uplink subframe includes feedback information, and
   wherein data is allocated to at least one of the at least one uplink subframe and the at least one downlink subframe.

8. The method as claimed in claim 7, wherein the at least one uplink frame and the at least one downlink frame include the at least one uplink subframe and the at least one downlink sub frame, respectively, and
   wherein a ratio of the number of the at least one uplink subframe to the number of the at least one downlink subframe corresponds to a first ratio.

9. The method as claimed in claim 8, wherein the first ratio is A:B, which is a ratio of the number of uplink subframes with respect to the number of downlink subframes, and the ratio of A:B is any one of 5:3, 4:4, and 6:2.

10. The method as claimed in claim 7, wherein data requiring short latency is allocated to at least one of the at least one uplink subframe and the at least one downlink subframe.

11. The method as claimed in claim 7, wherein data requiring short latency is allocated to at least one of one uplink subframe and one downlink subframe, and data requiring long latency is allocated to at least one of at least two uplink subframe and at least two downlink subframe.

12. The method as claimed in claim 11, wherein, a retransmission delay of the data requiring long latency is longer than a retransmission delay of the data requiring short latency.

13. A Base Station (BS) for transmitting and receiving a signal in a mobile communication system, the BS comprising:
   a transmitter for transmitting the signal using a frame; and
   a receiver for receiving the signal using the frame,
   wherein the frame includes at least one uplink frame and at least one downlink frame, the at least one uplink frame includes at least one uplink subframe supporting Hybrid Automatic Repeat Request (H-ARQ) Feedback within one frame interval, the at least one downlink frame includes at least one downlink subframe supporting H-ARQ Feedback within one frame interval, the at least one downlink subframe includes resource assignment information and feedback information, and the at least one uplink subframe includes feedback information, and
   wherein data is allocated to at least one of the at least one uplink subframe and the at least one downlink subframe.

14. The BS as claimed in claim 13, wherein data requiring short latency is allocated to at least one of the at least one uplink subframe and the at least one downlink subframe.

15. The BS as claimed in claim 13, wherein data requiring short latency is allocated to at least one of one uplink subframe and one downlink subframe, and data requiring long latency is allocated to at least one of at least two uplink subframe and at least two downlink subframe.

16. The BS as claimed in claim 15 wherein, a retransmission delay of the data requiring long latency is longer than a retransmission delay of the data requiring short latency.

17. The BS as claimed in claim 13, wherein the at least one uplink frame and the at least one downlink frame include the at least one uplink subframe and the at least one downlink subframe respectively, and wherein a ratio of the number of the at least one uplink subframe to the number of the at least one downlink subframe corresponds to a first ratio.

18. The BS as claimed in claim 17, wherein the first ratio is A:B, which is a ratio of the number of uplink subframes with respect to the number of downlink subframes, and the ratio of A:B is any one of 5:3, 4:4, and 6:2.

19. A Mobile Station (MS) for transmitting and receiving a signal in a mobile communication system, the MS comprising:

a transmitter for transmitting the signal using a frame; and
   a receiver for receiving the signal using the frame,
   wherein the frame includes at least one uplink frame and at least one downlink frame, the at least one uplink frame includes at least one uplink subframe supporting Hybrid Automatic Repeat Request (H-ARQ) Feedback within one frame interval, the at least one downlink frame includes at least one downlink subframe supporting H-ARQ Feedback within one frame interval, the at least one downlink subframe includes resource assignment information and feedback information, and the at least one uplink subframe includes feedback information, and
   wherein data is allocated to at least one of the at least one uplink subframe and the at least one downlink subframe.

20. The MS as claimed in claim 19, wherein data requiring short latency is allocated to at least one of the at least one uplink subframe and the at least one downlink subframe.

21. The MS as claimed in claim 19, wherein data requiring short latency is allocated to at least one of one uplink subframe and one downlink subframe, and data requiring long latency is allocated to at least one of at least two uplink subframe and at least two downlink subframe.

22. The MS as claimed in claim 21, wherein, a retransmission delay of the data requiring long latency is longer than a retransmission delay of the data requiring short latency.

23. The MS as claimed in claim 19, wherein the at least one uplink frame and the at least one downlink frame include the at least one uplink subframe and the at least one downlink subframe respectively, and wherein a ratio of the number of the at least one uplink subframe to the number of the at least one downlink subframe corresponds to a first ratio.

24. The MS as claimed in claim 23, wherein the first ratio is A:B, which is a ratio of the number of uplink subframes with respect to the number of downlink subframes, and the ratio of A:B is any one of 5:3, 4:4, and 6:2.

* * * * *